(12) United States Patent
Mitchell, Sr.

(10) Patent No.: US 10,584,567 B1
(45) Date of Patent: Mar. 10, 2020

(54) SHALE GAS EXTRACTION SYSTEM

(71) Applicant: Farris Mitchell, Sr., Flower Mound, TX (US)

(72) Inventor: Farris Mitchell, Sr., Flower Mound, TX (US)

(73) Assignee: Farris Mitchell, Sr., Flower Mound, TX (US)

( * ) Notice: Subject to any disclaimer, the term of this patent is extended or adjusted under 35 U.S.C. 154(b) by 7 days.

(21) Appl. No.: 14/958,205

(22) Filed: Dec. 3, 2015

Related U.S. Application Data

(60) Provisional application No. 62/087,058, filed on Dec. 3, 2014.

(51) Int. Cl.
*E21B 43/24* (2006.01)
*E21B 43/16* (2006.01)
*E21B 47/06* (2012.01)

(52) U.S. Cl.
CPC ............ *E21B 43/24* (2013.01); *E21B 43/168* (2013.01); *E21B 47/065* (2013.01)

(58) Field of Classification Search
CPC ......... E21B 43/24; E21B 43/168; E21B 47/06
See application file for complete search history.

(56) References Cited

U.S. PATENT DOCUMENTS

| | | | | | |
|---|---|---|---|---|---|
| 3,358,756 | A | * | 12/1967 | Vogel | E21B 43/2405 166/266 |
| 3,548,938 | A | * | 12/1970 | Parker | E21B 43/2403 166/256 |
| 3,954,140 | A | * | 5/1976 | Hendrick | E21B 43/24 166/302 |
| 2004/0069487 | A1 | * | 4/2004 | Cook | E21B 33/124 166/250.01 |
| 2006/0065400 | A1 | * | 3/2006 | Smith | E21B 43/26 166/308.1 |
| 2007/0056726 | A1 | * | 3/2007 | Shurtleff | E21B 43/305 166/245 |
| 2012/0215365 | A1 | * | 8/2012 | Nath | E21B 43/34 700/282 |
| 2016/0251578 | A1 | * | 9/2016 | Trad | C10B 53/06 |

* cited by examiner

*Primary Examiner* — Shane Bomar
(74) *Attorney, Agent, or Firm* — Eldredge Law Firm; Richard Eldredge

(57) ABSTRACT

A shale gas extraction system includes a gas storage container configured to store gas, a heater in gaseous communication with the gas storage container, and a pump in gaseous communication with the gas storage container. The method includes extracting the shale gas from a layer of shale material, which includes the steps of heating a gas to predetermined temperature, pressurizing the gas to a predetermined pressure, driving the gas to the layer of shale material, and heating the shale gas with the gas.

4 Claims, 3 Drawing Sheets

SHALE GAS EXTRACTION SYSTEM

BACKGROUND

1. Field of the Invention

The present invention relates generally to the gas extraction systems, and more specifically, to heated gas system for fracking.

2. Description of Related Art

Fracking is a well known process to break apart shale and extract the gas therefrom. FIG. 1 depicts a conventional fracking process utilizing a conventional shale gas extraction system 101, which includes a tower 103 operably associate with a well pipe 105 and a gas container 107. During operation, the well pipe 105 travels below a ground surface 109 to a gas reservoir 111 within an underground area 113 primarily composed of shale material. As depicted, the pipe extends to horizontally within the gas reservoir, thereby increasing exposure and extraction.

A commonly problems associated with a system 101 is the inability to efficiently extract the gas from the gas reservoir 111. It should be understood that the fracking process creates fractures within the shale for gas extraction. However, the fractures do not effectively reach and extract the majority of gas trapped within the shale.

Although great strides have been made in the area of shale gas extraction systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
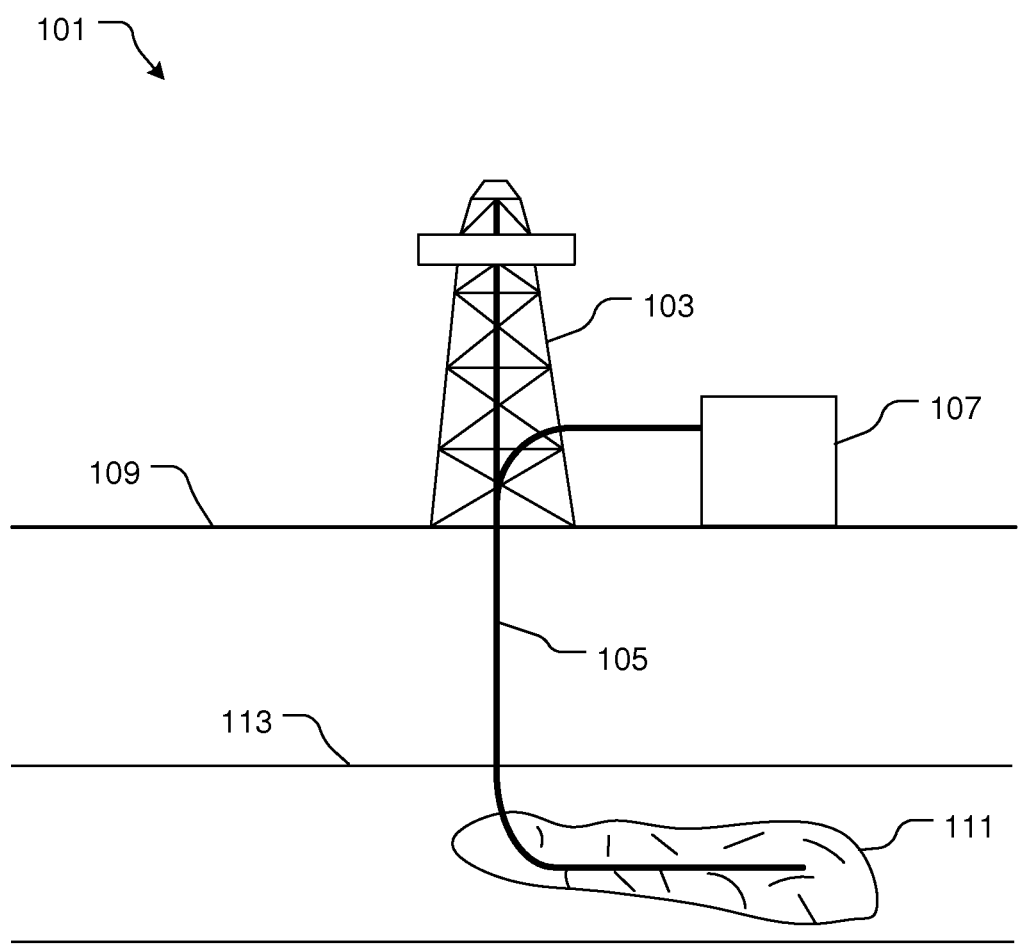
FIG. 1 is a front view of a conventional shale gas extraction system.

While the shale gas extraction system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional gas extraction systems. Specifically, the system and method of the present application includes the process heating and pressurizing gas to be injected into the shale, which in turn causes the shale gas to extract more easily. The system and method provides significant advantages, namely, an increased production rate of gas being extracted from the shale. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
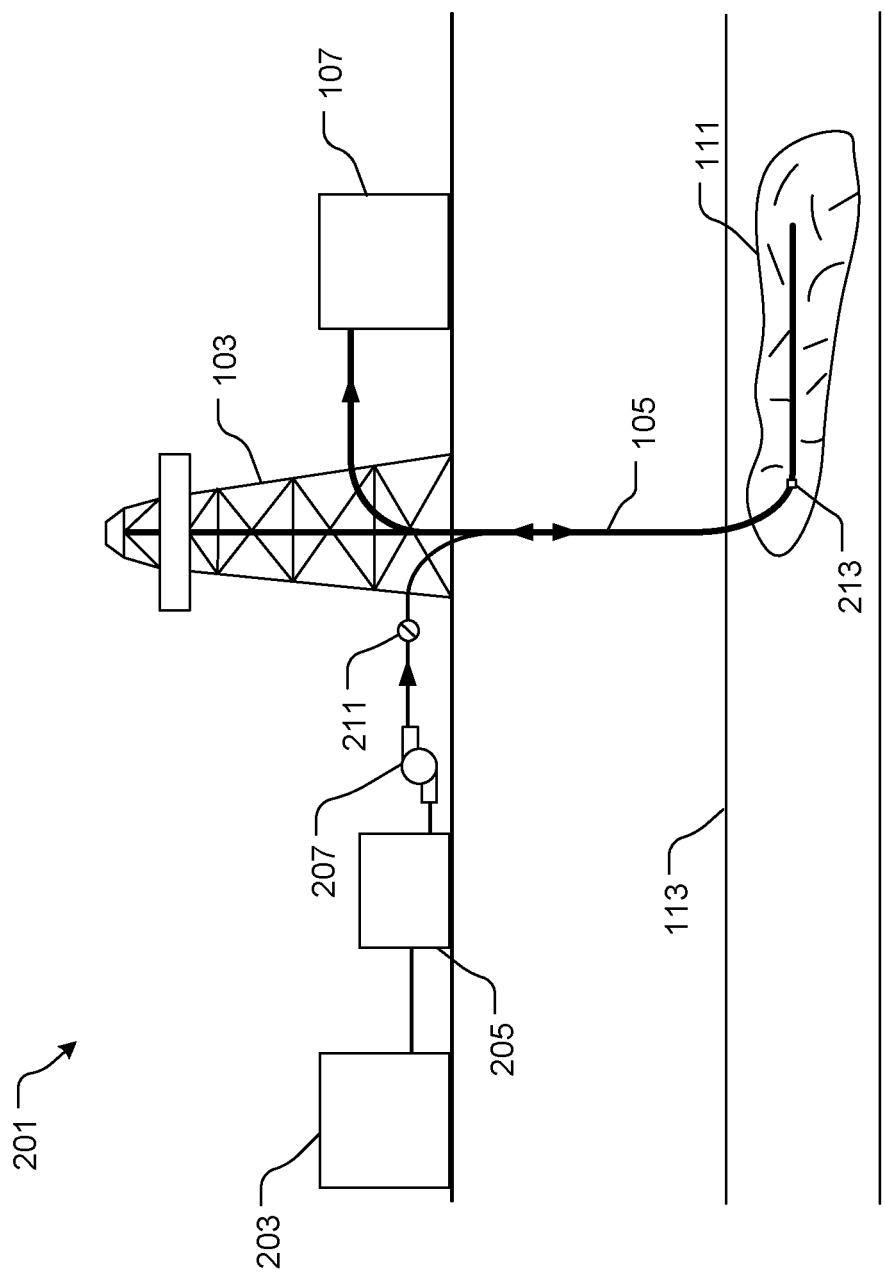
FIG. 2 is a front view of a shale gas extraction system in accordance with a preferred embodiment of the present application.

Referring now to the drawings wherein like reference characters identify corresponding or similar elements throughout the several views, FIG. 2 depicts a front view of a shale gas extraction system 201 in accordance with a preferred embodiment of the present application. It will be appreciated that system 201 overcomes at least one of the above-listed problems commonly associated with the conventional shale gas extraction systems.

As depicted, system 201 preferably utilizes the same tower 103 and well pipe 105 of the conventional system 101. Thus, it will be appreciated that the features discussed herein could easily be incorporated with existing systems, thereby allowing retrofitting of the existing systems.

In the contemplated embodiment, system 201 preferably includes one or more of a gas storage container 203 in gaseous communication with a heater 205 and a pump 207. During use, the gas stored within the container 203 is channeled to and heated within the heater 205 to a desired temperature. Thereafter, the gas is channeled to and pressurized and driven with pump 207. The heated and pressurized gas is then channeled through well pipe 105 to the gas reservoir 111.

As discussed more fully below, the heated and pressurized gas is injected within the shale and gas reservoir, which in turn heats the trapped gas for easier extraction.

System 201 is further provided with a shutoff valve 211 in communication with well pipe 105 and configured to prevent the shale gas from entering system 201. Also, it is contemplated having a sensor 213 in communication with a control system (not shown), which in turn determines the desired pressure and temperature of the gas to maximize extraction. In one embodiment, the sensor 213 travels down well pipe 105 to a selected location, e.g., the depth location of the gas reservoir 111.

In the preferred embodiment, the pressure of the gas is at least the pressure of the gas in the gas reservoir 111. This value may be calculated merely by algorithms that utilize the depth of gas reservoir 111 and the characteristics of the gas stored therein to determine the optimal pressure. In the preferred embodiment, sensor 213 is used to determine the optimal pressure. It should be understood that the gas pressure of the heated gas must be greater than the shale gas stored within reservoir 111 for travel through well pipe 105.

Sensor 213 could also be used to determine the temperature of the shale gas within reservoir 111. It is contemplated heating the gas within heater 205 to a temperature twice the temperature of the shale gas.

Figure 3:
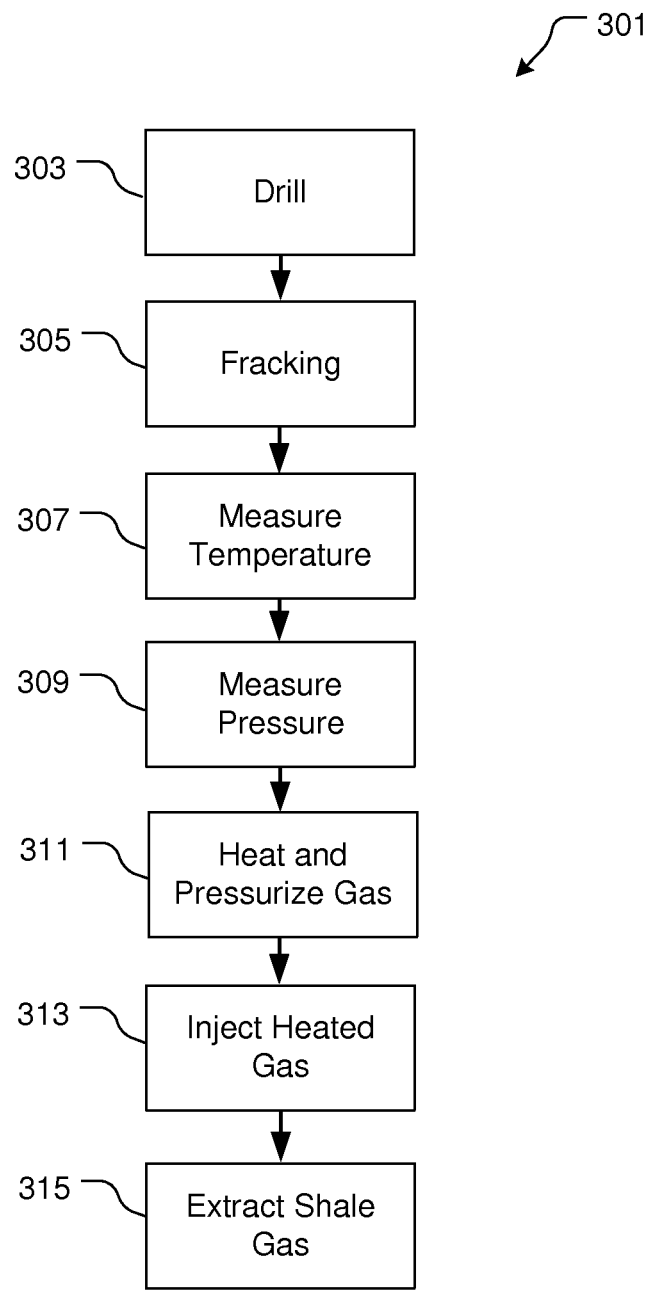
FIG. 3 is a flowchart depicting the preferred process of the present application.

Referring now to FIG. 3 in the drawings, a flowchart 301 depicts the process of extracting the shale gas in accordance with the preferred embodiment of the present application.

In the preferred process, the well pipe 105 is drilled to a predetermined depth underground to reach the embedded shale, as depicted in box 303. Thereafter, the shale is fractured to separate the shale gas from the shale, which in turn forms a gas reservoir 111, as depicted in box 305. The temperature and pressure of the shale gas is measured, as depicted by boxes 307, 309. As discussed, the preferred process of measuring temperature and pressure is achieved through a sensor 213. The gas entering the gas reservoir is heated and pressurized with a heater 203 and a pump 205, as depicted in box 311. The heated gas is injected into the shale, which in turn causes the gas trapped within the shale to more easily be extracted, as depicted in boxes 313, 315.

In the preferred embodiment, the heated gas is natural gas; however, other gases such as, for example, nitrogen, could be utilized in lieu of the preferred embodiment.

It should be understood that alternative embodiments could include a pipe used solely with the components of system 201. For example, system 201 could include a pipe that travels alongside pipe 105 and configured to inject the heated gas proximate to the gas reservoir 111, which in turn heats the surrounding gas. In another alternative embodiment, system 201 could include a pipe positioned between two or more pipes 105 and configured to perform the features discussed herein with respect to heating the surrounding shale gas.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A shale gas extraction system, comprising:
   a gas storage container configured to store gas;
   a heater in gaseous communication with the gas storage container;
   a pump in gaseous communication with the gas storage container;
   a pipe extending through a fluid reservoir embedded within a layer of embedded shale ground material; and
   a sensor secured to a section of the pipe disposed within the fluid reservoir and in fluid communication with a shale gas within the fluid reservoir, the sensor is configured to determine pressure and temperature of fluid within the fluid reservoir;
   wherein the heater and the pump are configured to heat and pressurize the gas in a gaseous state to a predetermined temperature and pressure; and
   wherein the pump drives the gas to a fluid reservoir embedded within a layer of embedded shale ground material, which in turn heats a shale gas trapped within the shale ground material.

2. The shale gas extraction system of claim 1, wherein the gas is heated to twice the temperature of the shale gas.

3. The shale gas extraction system of claim 1, wherein the gas is pressurized to a pressure greater than the pressure of the shale gas.

4. A method to extract shale gas from a layer of shale material, comprising:
   placing a pipe within a fluid reservoir embedded within a layer of embedded shale ground material;
   securing a sensor to a section of the pipe disposed within the layer of embedded shale ground material;
   measuring temperature and pressure of a shale gas within the fluid reservoir with the sensor;
   heating a gas to predetermined temperature above twice the temperature of the shale gas;
   pressurizing the gas to a predetermined pressure above the pressure of the shale gas;
   driving the gas in a gaseous state to the layer of shale material; and
   heating the shale gas with the gas;
   wherein the heated gas heats the shale gas, which in turn extracts the shale gas from the shale.

\* \* \* \* \*